US006831917B1

(12) United States Patent
Cheriton

(10) Patent No.: US 6,831,917 B1
(45) Date of Patent: Dec. 14, 2004

(54) NETWORK ADDRESS TRANSLATION FOR MULTICAST VIRTUAL SOURCING

(75) Inventor: David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/566,902

(22) Filed: May 10, 2000

(51) Int. Cl.[7] .............................................. H04L 12/28
(52) U.S. Cl. ...................................... 370/392; 370/535
(58) Field of Search ................................ 370/389, 392, 370/400, 401, 474, 535, 537, 538

(56) References Cited

U.S. PATENT DOCUMENTS

| | | | | |
|---|---|---|---|---|
| 4,814,883 A | | 3/1989 | Perine et al. | 358/181 |
| 5,138,440 A | * | 8/1992 | Radice | 370/474 |
| 5,517,494 A | | 5/1996 | Green | 370/60 |
| 5,561,670 A | | 10/1996 | Hoffert et al. | 370/94.1 |
| 5,740,171 A | | 4/1998 | Mazzola et al. | 370/392 |
| 5,793,763 A | | 8/1998 | Mayes et al. | 370/389 |
| 5,894,480 A | | 4/1999 | Hoffert et al. | 370/389 |
| 6,000,053 A | * | 12/1999 | Levine et al. | 370/470 |
| 6,006,272 A | | 12/1999 | Aravamudan et al. | 709/245 |
| 6,119,171 A | * | 9/2000 | Alkhatib | 370/409 |
| 6,272,127 B1 | * | 8/2001 | Golden et al. | 370/352 |
| 6,542,503 B1 | * | 4/2003 | Xu et al. | 370/390 |
| 6,597,700 B2 | * | 7/2003 | Golikeri et al. | 370/401 |

OTHER PUBLICATIONS

Ranch, David A., Guru Guidance—Setting up IP Masquerade, Aug. 1999, Linux Magazine.*

Karanjit S. Siyan, Ph.D., *Inside TCP/IP,* Third Edition, New Riders Publishing, 1997, Chapter 9, pp. 426–429.

"*The IP Network Address Translator* (*NAT*)," Internet Engineering Task Force (IETF) Request for Comment (RFC) 1631; K. Egevang,, P. Francis; May 1994.

"*IP Multicast Channels: Express Support For Large–Scale Single–Source Applications";* Hugh W. Holbrook and David R. Cheriton; SigComm 1999.

"*Internet Multicast Today";* Internet Protocol Journal, vol. 2, No. 4; Mark Handley; Dec. 1999.

* cited by examiner

*Primary Examiner*—Chi Pham
*Assistant Examiner*—Keith M. George
(74) *Attorney, Agent, or Firm*—Campbell Stephenson Ascolese LLP

(57) ABSTRACT

A method for using network address translation in switches and routers to define a virtual host as the source of a multicast channel within a single-source multicast model and to translate packet addresses from different multicast sources so that the packets appear to be originating from the virtual host. Address-translated packets are thus forwarded through a single-source multicast channel and received by the subscribing host(s)/clients as though the packets came from a single "virtual" source. This methodology can be used to map two or more sources simultaneously onto the same multicast channel. Such a mapping is useful, for example, to present multiple views of a sporting event video broadcast, provide advertisement insertion capability, or to support transparent fail-over to a backup video source in a critical multicast application. Subscribing client hosts in the multicast reception group simply subscribe to the single virtual host as the source of a multicast channel.

32 Claims, 7 Drawing Sheets

525 520 Host S1 510 S' G' S" G" Host S2 515 S G 1 541 542 543 550 Client Client Client Client 535

NETWORK ADDRESS TRANSLATION FOR MULTICAST VIRTUAL SOURCING

BACKGROUND OF THE INVENTION

1. Field of the Invention

The present invention relates to internetworking and in particular to packet multicasting.

2. Description of the Related Art

Conventional Internet Protocol (IP) multicast provides a multi-source group model in which receivers in a multicast group G receive packets from any source S on the Internet. Conventional IP multicasting is further described in Karanjit S. Siyan, Inside TCP/IP, 3d ed., New Writers Publishing, 1997, pages 426–429. IP multicasting is also described in U.S. Pat. No. 5,517,494 to Green entitled "Method and System of Multicast Routing for Groups with a Single Transmitter" and M. Handley, "Internet Multicast Today," The Internet Protocol Journal, December 1999, p. 2. All of these references are incorporated herein by reference in their entireties.

Recent work has recognized that major benefits in addressing, access control, and routing scalability are to be found from restricting multicast to a single-source multicast model. For example see, Hugh W. Holbrook and David R. Cheriton, "IP Multicast Channels: EXPRESS Support for Large Scale Single-source Applications" presented at SIGCOMM 1999, incorporated herein and by reference in its entirety. Most current applications for multicast are transmitted from a single-source or largely from a single-source out of a small group of sources. For example, video broadcasts, corporate file distribution, and stock quote distribution and dissemination applications are a few well-known, single-source applications. All essentially provide source data from one transmitting host.

One problem seen in the art is encountered when supporting multicast applications that are largely, but not entirely, single-source. Current state of the art approaches typically delegate the multicasting operation entirely to (slower) application level proxies, such as those provided by Akamai or FastForward. Other alternatives known in the art rely on complicated network and receiving host protocols. Such systems are described in U.S. Pat. Nos. 5,894,480 and 5,561,670, both to Hoffert et al. And both entitled "Method and Apparatus for Operating a Multicast System on an Unreliable Network." These patents describe variations on the well-known Internet Group Management Protocol (IGMP) and are incorporated by reference herein in their entireties.

All of these prior art methods share a common failing in that each is necessarily slowed by the overhead of the messaging protocols and OSI upper-layer application processing. This slow down also increases cost by constraining transmission speed, adding processing complexity, and increasing the probability of error.

What is needed is a simple, scaleable method of providing single-source multicasting from a small plurality of sources that appears to receiver groups as if it were originating from a unique, single-source host.

SUMMARY

The present invention is a method for using network address translation (NAT) in switches and routers to define a virtual host as the source of a multicast channel within a single-source multicast model. This method translates packets from different (actual) multicast sources to the virtual host as part of the conventional packet forwarding process. Address-translated packets are thus forwarded through a single-source multicast channel and received by the subscribing host(s) as though the packets came from a single "virtual" source.

This methodology can be used to map two or more sources simultaneously onto the same multicast channel. Such a mapping is useful, for example, to present multiple views of a sporting event video broadcast, provide advertisement insertion capability, or to support transparent fail-over to a backup video source in a critical multicast application.

Listening or receiving hosts in the multicast reception group simply subscribe to the single virtual host as the source of a multicast channel. It is not necessary for the recipient hosts to know the actual origin of the multicast data stream or its constituent parts; all that is required is that the recipient hosts subscribe to the proper multicast group channel and the virtual host address. The receiving group hosts are thus oblivious to the physical source of the multicast content. This application is analogous to a web site in which a single virtual host is actually implemented by multiple physical hosts, except the virtual host for the client machines in the web site case is the destination address to which they send, rather than the source address from which members of the multicast group receive.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

As a representative use of the present invention, consider the following situation: an Internet television station with a point of presence at an Internet Service Provider (ISP) headend allocates a virtual host address S and multicast address G for an Internet television channel. This address is identified as (S,G), denoting source S and subscriber recipient group G. Hosts that wish to receive this particular Internet television feed then subscribe to the multicast channel (S,G) in the conventional manner normally used in single-source multicast applications.

Figure 1:
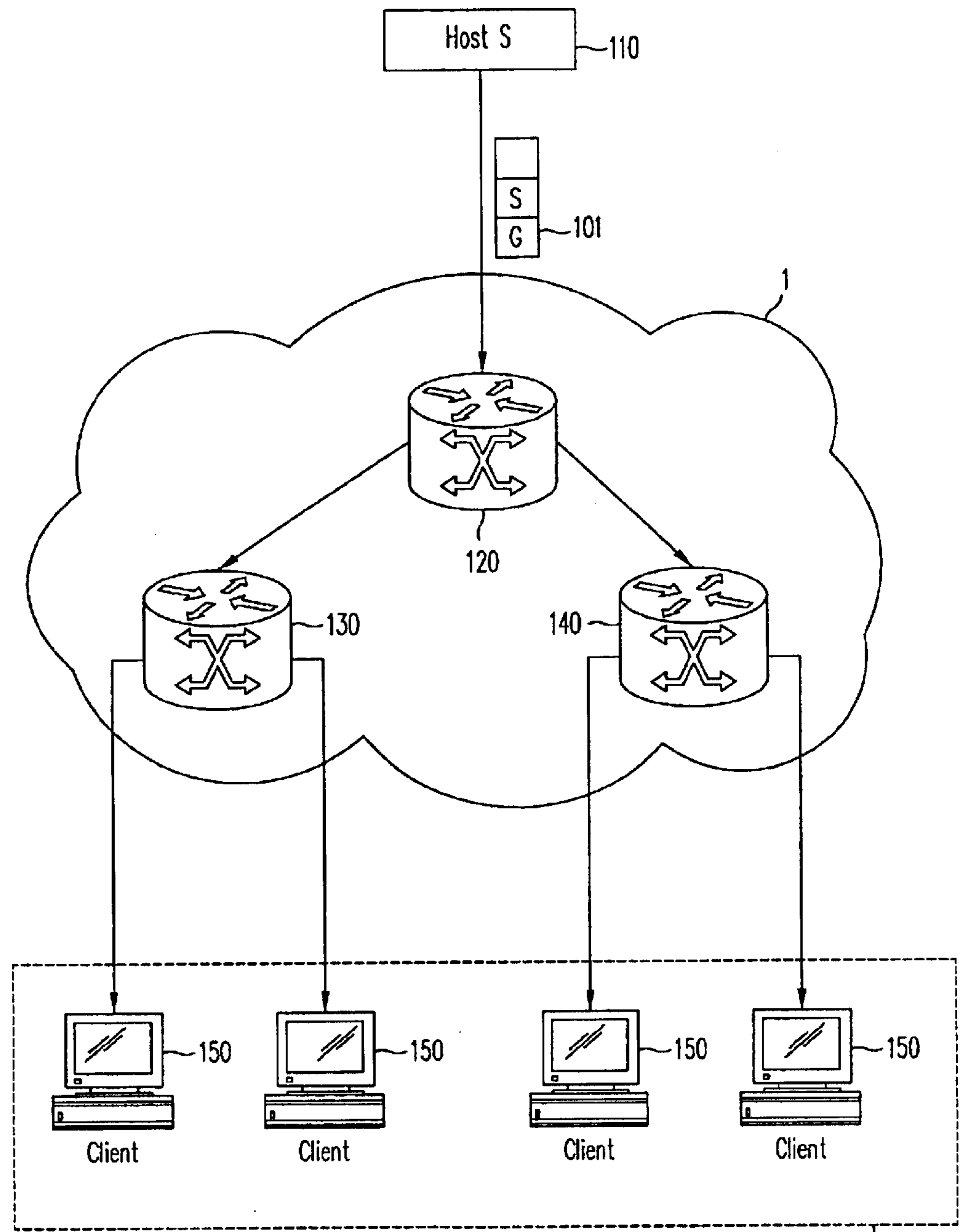
FIG. 1 is a high level schematic of a prior art multicast system.

In prior art multicast systems, shown schematically in FIG. 1, packets multicast from source host 110 (a.k.a. source S) to group 115 (a.k.a. group G) are replicated by one or more routers 120, 130, and 140, all a representative part of the well-known Internet 1, and delivered to each subscribing client host 150. Each subscriber 150 within group 115 is said to be subscribing to the single-source multicast channel identified by (S,G).

Network address translation (NAT) is also known in the art. See, e.g., U.S. Pat. Nos. 5,793,763 to Mayes et al., "Security System for Network Address Translation Systems"; 5,740,171 to Mazzola et al., "Address Translation Mechanism for a High-Performance Network Switch"; and 6,006,272 to Aravamudan et al., "Method for Network Address Translation," incorporated herein by reference in their entireties.

Figure 2:
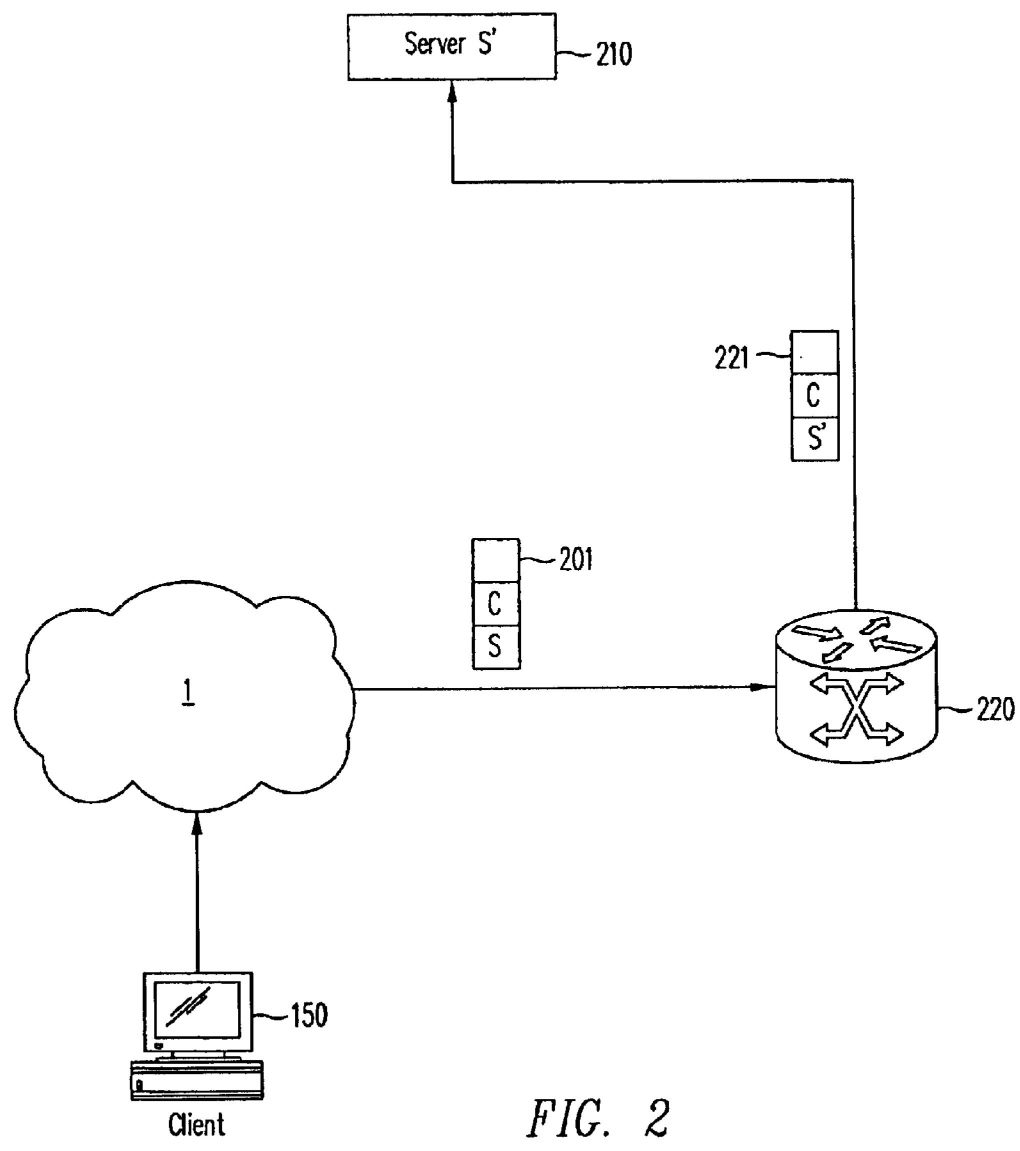
FIG. 2 is a high level schematic of a prior art Network Address Translation (NAT) system showing an implementation of destination address translation.

One prior art method of performing NAT is shown schematically in FIG. 2. Client host 150 sends packets 201 over Internet 1. These packets are addressed with source address (SA) C and destination address (DA) S, where S is the address of a unicast virtual host. NAT router 220 translates the virtual host DA S to S' (which is the unicast address of [real] server 210) and forwards the modified packet 221 to server 210.

Figure 3:
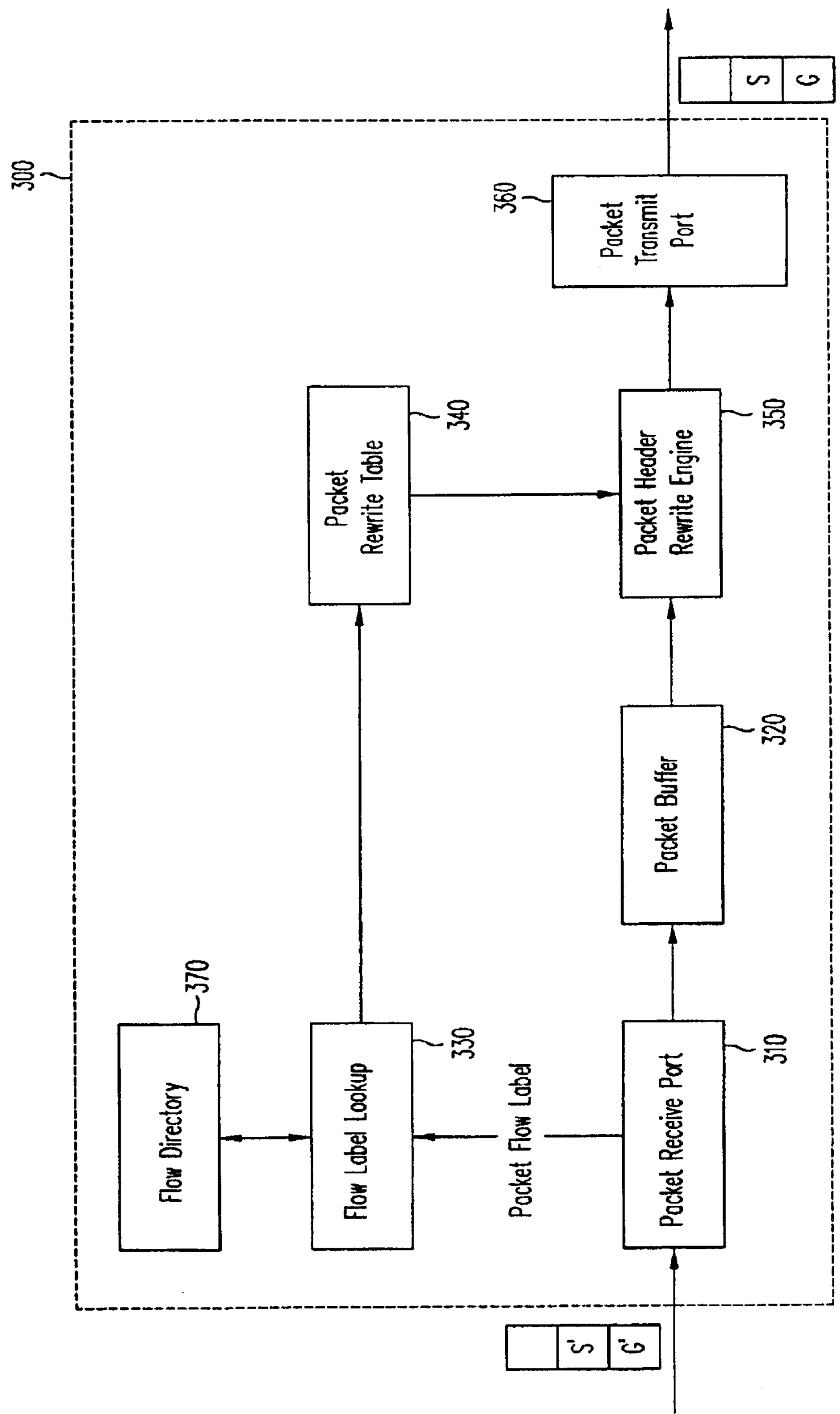
FIG. 3 is a high level schematic of a NAT-capable switch/router, according to one embodiment of the present invention.

FIG. 3 illustrates a NAT-capable switch 300 according to one embodiment of the present invention. Packets addressed to (S',G') are received from the Internet (not shown) at packet receive port 310. The packet flow label, which conventionally includes all or part of the packet header as commonly known in the art, is passed the flow label lookup module 330. Packets are than stored in packet buffer 320, pending transmission scheduling.

Flow label lookup module 330 maintains a flow directory 370 to map each flow label to an index that points to an entry in rewrite table 340. Packet rewrite table 340 stores rewrite information for packets matching some or all flow table entries which are programmed to redirect packets to multicast group G as if they had come from a virtual host source S. This rewrite information is used by packet header rewrite engine 350 to rewrite the SA and DA in the packet header prior to transmission out of NAT-capable switch 300 through transmit port 360.

Packet receive port 310, packet buffer 320, and packet transmit port 360 are conventional modules commonly used in data communications switches and routers. These modules, well-known in the art, typically consist of circuits (hardware) and/or software configured to provided the required functionality. Flow label lookup 330 and corresponding flow directory 370 are conventionally implemented using standard lookup algorithms and/or hardware (such as a content addressable memory [CAM] or random access memory [RAM]). Packet rewrite table 340 is implemented, in some embodiments of the present invention, in a conventional RAM.

Packet rewrite engine 350 is implemented, in one embodiment of the present invention, as part of the conventional packet routing mechanism whereby the destination address (at a minimum) for the next network hop is written into the packet header.

Figure 4:
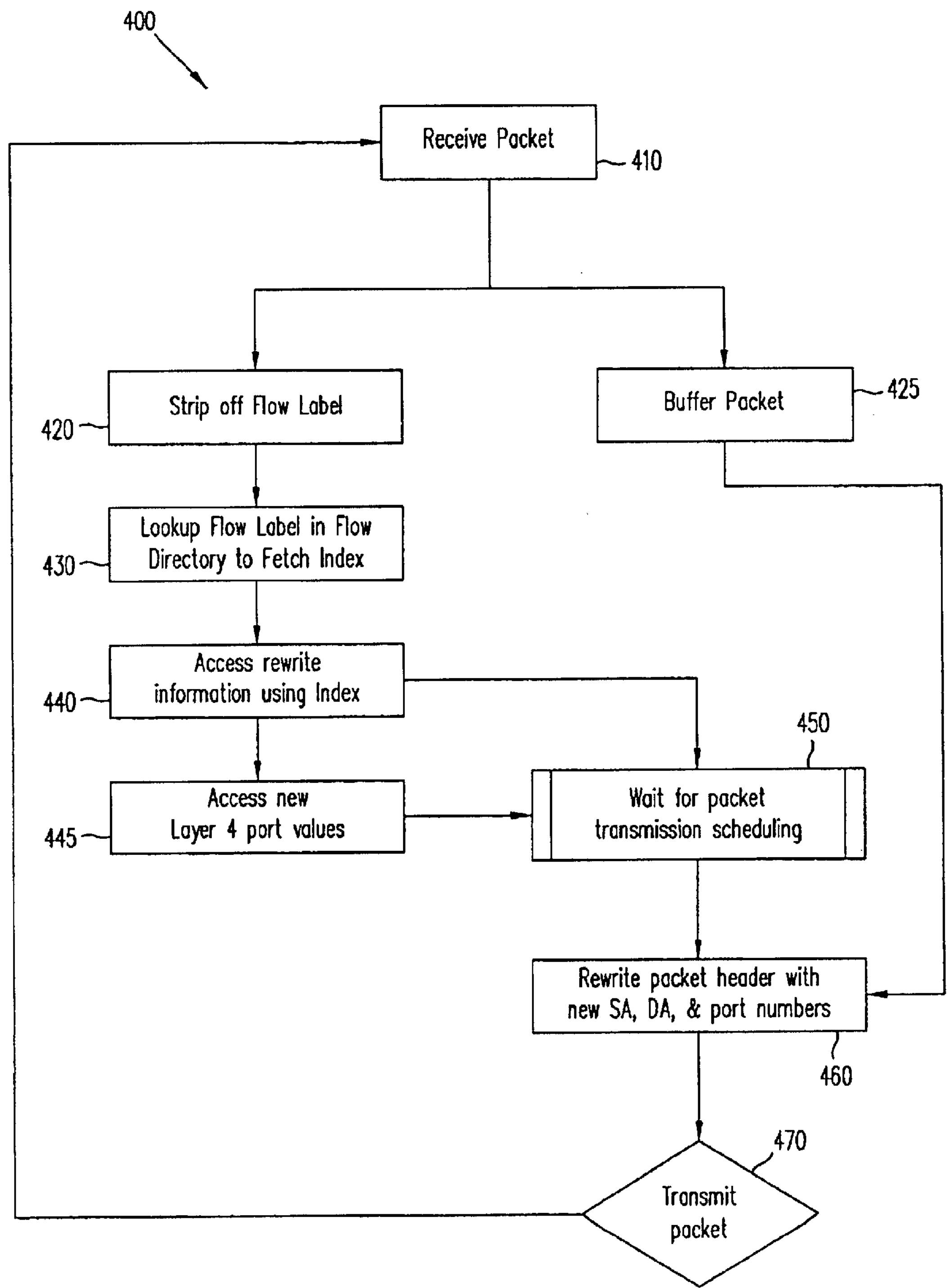
FIG. 4 is a flowchart of the virtual host NAT process, according to one embodiment of the present invention.

The virtual host NAT process 400 is depicted in the flowchart of FIG. 4, according to one embodiment of the present invention. Process 400, which operates in a continuous loop, logically begins at step 410 with the receipt of an incoming packet. The flow label (including but not limited to some or all of the packet header, as known and understood in the art) is stripped off 420 and the packet is stored (buffered) temporarily, step 425. At this point, the packet SA is defined as S' and the DA is defined as G', which represents the actual source of the packet (S') and the address of the NAT switch/router (G'). G' may also represent a multicast address to which the NAT switch/router is listening or even a separate address that the NAT switch/router has been programmed to intercept.

In step 430, a lookup is performed using the flow label, returning an index to the rewrite information corresponding to the specific flow label. Rewrite information is read in step 440, using the index. This rewrite information indicates that the SA of the incoming packet should be changed to S (the virtual host) and the DA to G (the destination multicast group). Optionally (in some embodiments of the present invention), new values for the OSI layer 4 port numbers are also extracted from the rewrite table in step 445.

Step 450 is an optional wait state during which the process waits for the packet to be scheduled for outbound transmission. This step may be omitted in implementations where a scheduling delay or wait period is not present or required.

The packet is rewritten in step 460 to include the new SA S and the new DA G, as determined previously. Step 470 transmits the packet to multicast group G.

Returning to the television example noted above, the Internet television station has typically contracted for a network television feed, for example CBS or NBC. This system is depicted (at a high level) in FIG. 5. The Internet television station receives the network feed from a particular source host 510 (host S1) with a multicast address G'. The headend NAT router 520 at the ISP 525 used by the Internet television station is therefore configured to subscribe to (S',G') and to translate the IP source and destination addresses (SA and DA) of packets coming from source (S',G') to (S,G). In some embodiments, the NAT router 520 may also translate the UDP/TCP (OSI layer 4) port numbers and other high-level information in the packet during conventional routing. In another embodiment, the NAT router 520 may even translate between different data encodings, again using conventional techniques, in addition to performing virtual host translation.

Subscribers 550 join the single-source multicast group (S,G) by listening to NAT router 520, which has an IP address of S. As discussed above, NAT router 520 provides the address translation from source host 510 and routes packets over Internet 1 using routers 541, 542, and 543 (for example). One of ordinary skill in the art will appreciate that Internet 1 actually comprises an enormous number of routers; the routers here depicted are for ease of illustration rather than limitation.

In this configuration, the network address translation from (S',G') to (S,G) provides transparent source remapping to the virtual host (S,G) for all subscribers in subscribing group 535.

As is well known in the television broadcast industry, local insertion of station breaks or local advertising is commonly performed on network feeds. See, e.g., U.S. Pat. No. 4,814,883 to Perine et al., "Multiple Input/Output Video Switch for Commercial Insertion System," incorporated herein by reference in its entirety. In such a situation, a local television station receiving a network feed, inserts (using conventional automated equipment) its own advertising, station identification, and/or promotional materials in designated time slots within the video feed data stream.

The virtual hosting NAT method of the present invention enables an analogous local insertion capability for single-source multicast feeds. To insert a local station break or advertising from a second source 515 (host S2) designated (S",G"), the NAT router 520 forwarding state is changed (based on system time or an explicit time signal) to translate and forward packet addressed to (S",G") as if they were addressed to a virtual host (S,G).

In one embodiment, the time signal designates the beginning of the insert time slot. At the end of the designated time slot, the headend router 520 address translation mapping is changed back to the original video source 510 (S',G'). The video source may also be temporarily or permanently set to a third video source (not shown) to provide additional source options.

The change in network address translation mapping discussed above is performed in small numbers of milliseconds or less, which enables switching between the video frames of a video multicast stream. Thus, a seamless transition (as seen by subscribing hosts 550 in multicast group 535) between one program source 510 and another (e.g., source host 515) is provided by the present technique. In fact, subscribers 550 to such a single-source, virtual host multicast would likely be unable to detect a source transition because all of the traffic will appear to the subscribers as originating from a single virtual host (S,G).

In an alternate embodiment of the present invention, this same mechanism can be used to map two or more sources simultaneously onto the same multicast channel. Such multiple sources could be used for a variety of purposes, including (but not limited to) multiple views of sporting or performance events or transparent fail-over to a backup multicast source. FIG. 6 depicts an example of a time-multiplexed source system. As in FIG. 5, all packets are forwarded over the multicast channel 610, except that in the multiplex embodiment of FIG. 6 all sources are present in the channel, each in a separate time interval or division.

Sources 601, 602, and 603 (which may be TV cameras or video sources, for example) each supply packet streams to NAT router 620. Each packet stream is separately addressed ($S_x$,$G_x$), where x=the source number, e.g., x=1 for camera 1 (601), 2 for camera 2 (602), and so on.

Although a camera source is described, those skilled in the art will realize that packet sources other than a camera, such as a video tape player or digital video disk (DVD) can be used. Accordingly, the invention is not limited to any particular type of source.

The source packets ($S_x$,$G_x$) are combined and multiplexed in NAT router 620, entering multicast channel 610 as time tagged packets identified by the tuple (n,S,G), where n=the time slot identifier and S and G are the virtual host source S and destination multicast group G addresses. The time slot identifier is, in one embodiment of the present invention, an ordinal corresponding to x above. In the present example, where there are three sources, n takes only the values 1, 2, or 3.

Figure 5:
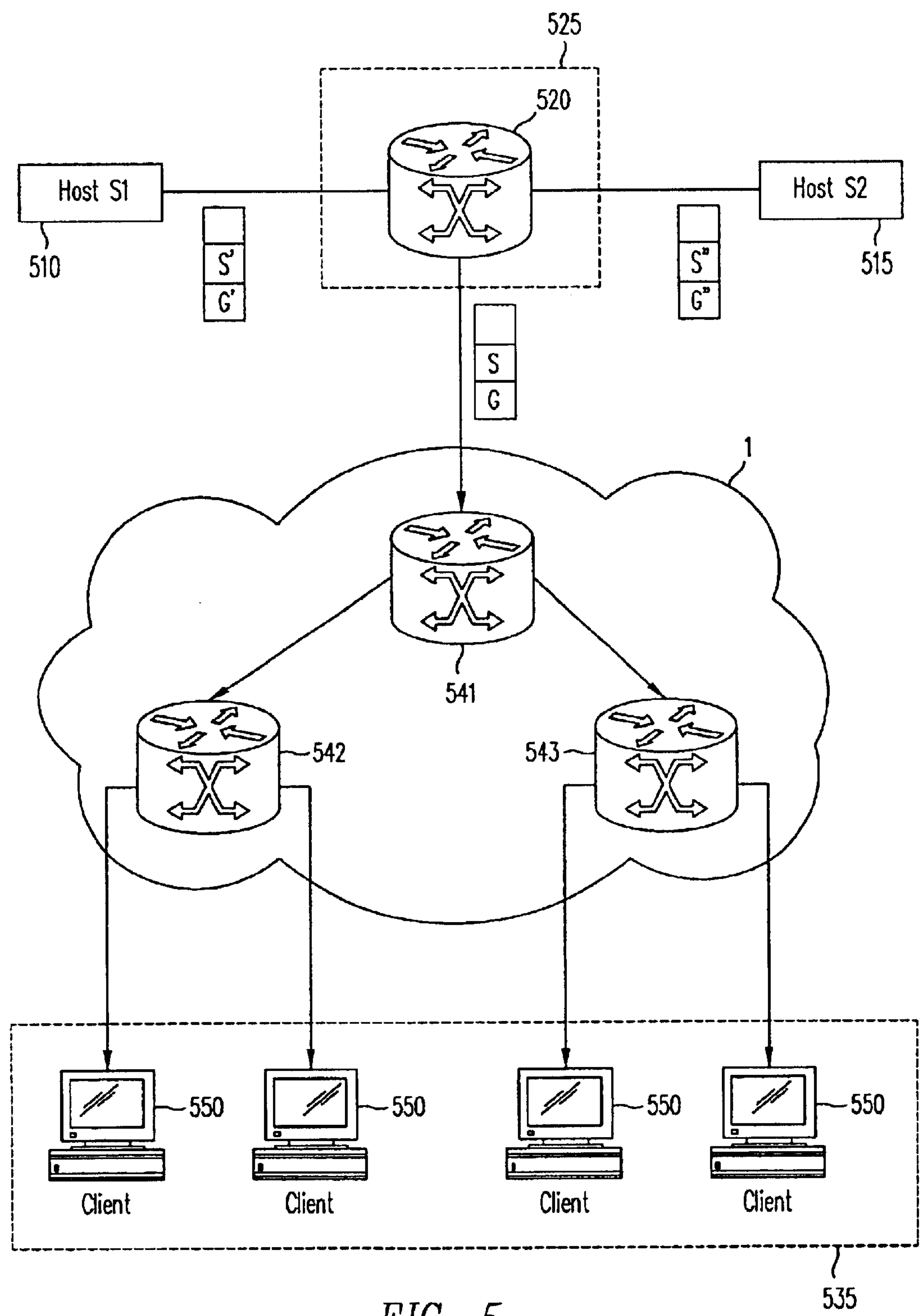
FIG. 5 is a high level schematic of an Internet television station using one embodiment of the present invention.
Figure 6:
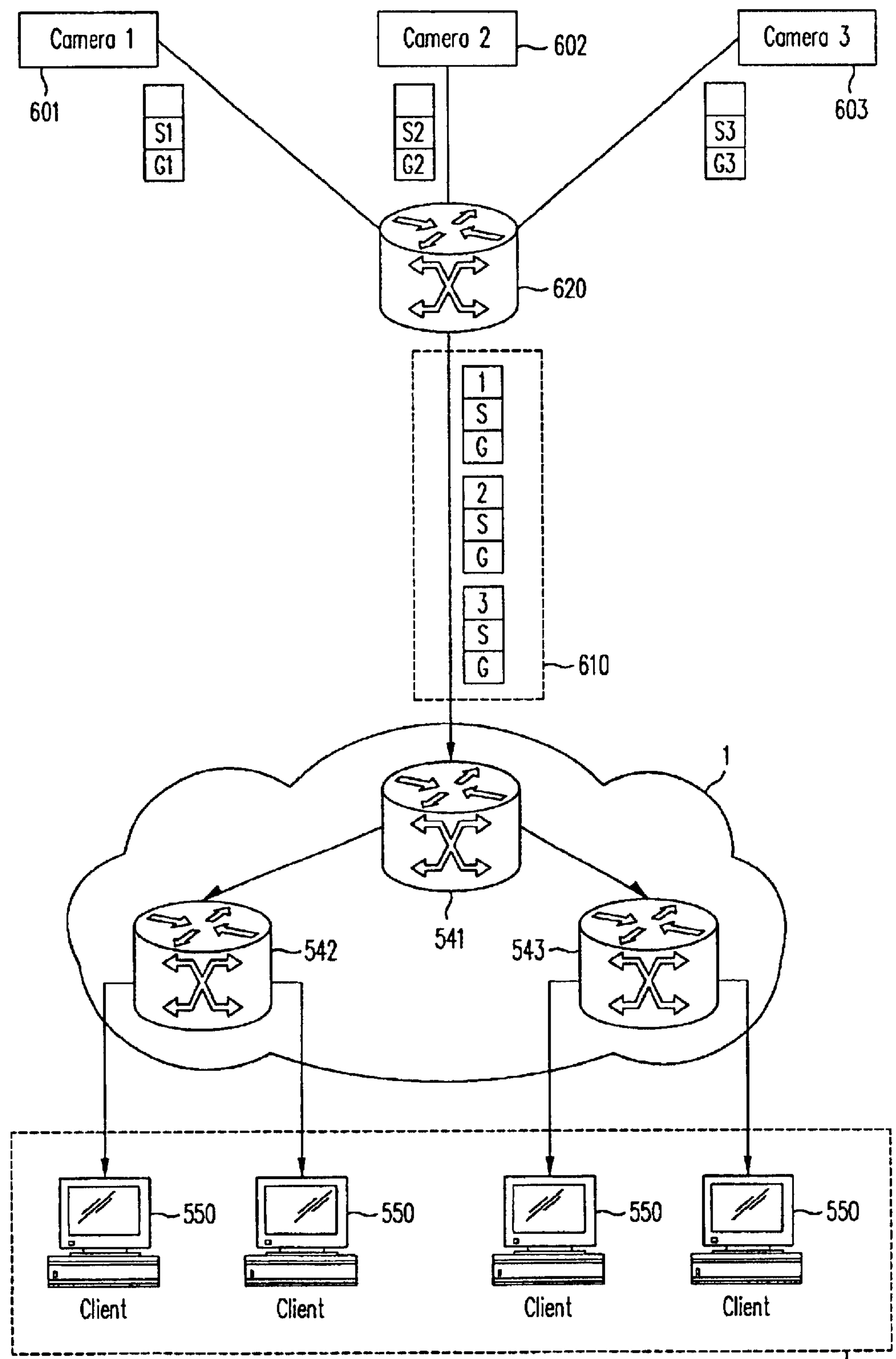
FIG. 6 is a high level schematic of source multiplexing using one embodiment of the present invention.

As in FIG. 5, multicast channel 610 is forwarded through Internet 1 and the routers and switches therein to subscribing clients 550 in multicast group 535. Two or more sources 601–603 can thus be combined over a common wide area multicast distribution channel 610. The multiplexed channel is then pulled apart (demultiplexed) on reception at the first edge routers connected to the Internet in the subscribing group of hosts (clients) 550. Such multiplexing might be motivated by the cost of a particular wide area multicast channel, allowing a cost saving to be realized through source multiplexing.

The multiple views from multiple sources and dynamic virtual host re-mapping capability disclosed here can also be used to provide additional levels of service, and thus subscriber value, to multicast transmissions. For example, dynamic virtual source remapping can be used to send the same multicast stream over multiple multicast channels to multiple destination groups. Time-based skewing either to time-shift receipt of the program at the subscribing hosts or to compensate for route transit time differences may also be provided. The former is useful for transmissions to multiple groups requiring reception of the same data but at different times. For example, a video playback starting 15 minutes later than an earlier multicast of the same video stream is also provided by one embodiment of the present invention.

Figure 7:
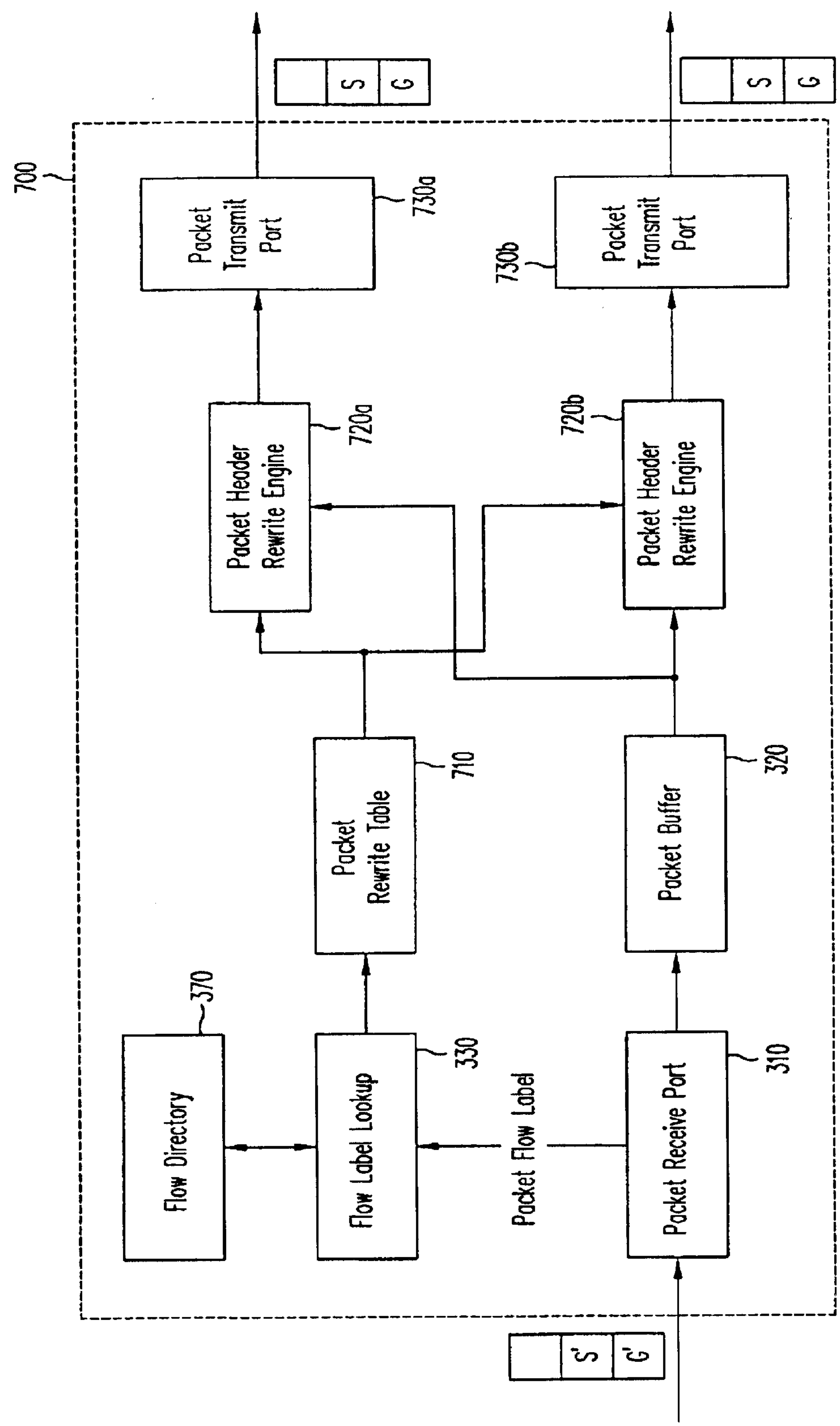
FIG. 7 is a high level schematic of NAT-capable switch/router with multiple multicast rewrites, according to one embodiment of the present invention.

FIG. 7 shows an example of multiple multicast rewrites for time-based skewing in a NAT-capable switch or router, according to one embodiment of the present invention. As discussed with regard to FIG. 3, packets destined to multiple clients enter the NAT switch 700 by packet receive port 310 and are stored temporarily in packet buffer 320. The packet flow label is used to perform a lookup in flow directory 370 using lookup module 330. The index returned from this lookup is used by packet rewrite table 710 to provide two or more different virtual source addresses and destination group addresses, ($S_0$,$G_0$), ($S_1$,$G_1$), . . . .

For each rewritten packet header containing a new SA and DA [e.g., ($S_0$,$G_0$), ($S_1$,$G_1$), . . . ], packet header rewrite module 720*a* or 720*b* (configured as one rewrite module 720 per unique SA/DA pair) rewrites the packet header to include the new SA and DA and passes the packet (when scheduled by conventional methods) to corresponding packet transmit port 730*a* or 730*b*.

One of ordinary skill in the art will appreciate that while only two replications are shown in FIG. 7, many such replications and associated rewrites and transmissions are possible. Extra replication and transmission paths have only been omitted for clarity and do not imply a limitation.

Furthermore, although separate packet header rewrite modules 720 and packet transmit ports 730 are described, those skilled in the art will realize that a single rewrite module 720 and a single corresponding transmit port 730 can be used for all rewrites. This is possible if conventional scheduling allows time-based skewing of the transmitted packets.

As a further alternative, a set of rewrite modules 720 and packet transmit ports 730 comprising less than the number of replications can be used, if only a limited amount of time skewing is to be provided by the conventionally packet transmission scheduling system. Accordingly, the invention is not limited to any particular quantity of rewrite modules 720 and packet transmit ports 730.

Support of a transparent fail-over to a backup source is also an important capability and a significant use of a multi-source NAT capability. For example, an important Internet video broadcast might use redundant sources for reliability and efficient distribution. If the headend distribution router providing source (S',G') detects a failure in its primary video source, it can quickly switch to a warm standby (backup) video source, in this case (S",G"). (Refer to FIG. 5 and the corresponding discussion for an example of how such switching can be implemented.) Again, since all subscribers in the multicast host group are seeing data transmitted from the same virtual host (S,G) this "behind the scenes" switching from source (S',G') to backup source (S",G") is transparent to the users.

As a further alternate embodiment, a headend router can also provide different translations based on aspects of the packet data. Thus, for example, if some listening hosts are connected to the network by a low bandwidth link and the video source uses a multilevel video resolution encoding or a similar basis for selective drop (as known in the art), packets representing the low resolution component can be translated to one multicast channel. High-resolution component packets can be translated to a second multicast channel. Only those hosts subscribing to the high-resolution channel will receive the high resolution encoding, providing an alternate method of implementing differentiated services over IP.

While foregoing discusses a variety of different Network Address Translations and combinations of translations, one of ordinary skill in the art will readily appreciate that additional combinations of well-known protocol translations, mappings, and encodings are known in the art and commonly used in multicast. Accordingly, the present invention is not limited to any single type of packet translation or mapping or combination thereof, but rather includes all such variations of the underlying multicast packet data utilizing virtual host address translation.

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

I claim:

1. A method of forwarding a packet comprising the steps of:

reading identifying packet information from said packet, said packet information comprising a source address and a destination address;

identifying a virtual source address for said packet based on said packet information;

modifying said packet by replacing the source address with said virtual source address to form a modified packet; and forwarding said modified packet to a single-source multicast channel.

2. The method of claim 1, further comprising:

for a plurality of source addresses, mapping each source address to the same said virtual source address.

3. The method of claim 1, further comprising:

identifying a virtual destination group address for said packet based on said identifying packet information; and modifying said packet by replacing the destination address with said virtual destination group address to form said modified packet prior to said forwarding.

4. The method of claim 3, wherein said modifying said packet by replacing the destination address further comprises mapping each destination address in a plurality of destination addresses to the same said virtual destination group address.

5. The method of claim 3, wherein said modifying said packet by replacing the destination address further comprises mapping each destination address in a plurality of destination addresses to one of a plurality of virtual destination group addresses.

6. A computer system for forwarding a packet, comprising computer instructions for:

reading identifying packet information from said packet, said packet information comprising a source address and a destination address;

identifying a virtual source address for said packet based on said packet information;

modifying said packet by replacing the source address with said virtual source address to form a modified packet; and forwarding said modified packet to a single-source multicast channel.

7. The computer system of claim 6, further comprising:

for a plurality of source addresses, mapping each source address to the same said virtual source address.

8. The computer system of claim 6, further comprising:

identifying a virtual destination group address for said packet based on said identifying packet information; and modifying said packet by replacing the destination address with said virtual destination group address to form said modified packet prior to said forwarding.

9. The computer system of claim 8, wherein said modifying said packet by replacing the destination address further comprises mapping each destination address in a plurality of destination addresses to the same said virtual destination group address.

10. The computer system of claim 8, wherein said modifying said packet by replacing the destination address further comprises mapping each destination address in a plurality of destination addresses to one of a plurality of virtual destination group addresses.

11. A computer-readable storage medium, comprising computer instructions for:

reading identifying packet information from said packet, said packet information comprising a source address and a destination address;

identifying a virtual source address for said packet based on said packet information;

modifying said packet by replacing the source address with said virtual source address to form a modified packet; and forwarding said modified packet to a single-source multicast channel.

12. The computer-readable storage medium of claim 11, further comprising:

for a plurality of source addresses, mapping each source address to the same said virtual source address.

13. The computer-readable storage medium of claim 11, further comprising:

identifying a virtual destination group address for said packet based on said identifying packet information; and modifying said packet by replacing the destination address with said virtual destination group address to form said modified packet prior to said forwarding.

14. The computer-readable storage medium of claim 13, wherein said modifying said packet by replacing the destination address further comprises mapping each destination address in a plurality of destination addresses to the same said virtual destination group address.

15. The computer-readable storage medium of claim 13, wherein said modifying said packet by replacing the destination address further comprises mapping each destination address in a plurality of destination addresses to one of a plurality of virtual destination group addresses.

16. A computer data signal embodied in a carrier wave, comprising computer instructions for:

reading identifying packet information from said packet, said packet information comprising a source address and a destination address;

identifying a virtual source address for said packet based on said packet information;

modifying said packet by replacing the source address with said virtual source address to form a modified packet; and forwarding said modified packet to a single-source multicast channel.

17. The computer data signal of claim 16, further comprising:

for a plurality of source addresses, mapping each source address to the same said virtual source address.

18. The computer data signal of claim 16, further comprising:

identifying a virtual destination group address for said packet based on said identifying packet information; and modifying said packet by replacing the destination address with said virtual destination group address to form said modified packet prior to said forwarding.

19. The computer data signal of claim 18, wherein said modifying said packet by replacing the destination address further comprises mapping each destination address in a plurality of destination addresses to the same said virtual destination group address.

20. The computer data signal of claim 18, wherein said modifying said packet by replacing the destination address further comprises mapping each destination address in a plurality of destination addresses to one of a plurality of virtual destination group addresses.

21. A computer system for forwarding a packet, comprising:

means for reading identifying packet information from said packet, said packet information comprising a source address and a destination address;

means for identifying a virtual source address for said packet based on said packet information, said means for identifying connected to said means for reading;

means for modifying said packet by replacing the source address with said virtual source address to form a modified packet, said means for modifying connected to said means for identifying; and means for forwarding said modified packet to a single-source multicast channel from said means for modifying.

22. The computer system of claim 21, further comprising:

means for mapping each of a plurality of source addresses to the same said virtual source address, said means for mapping interposed between said means for identifying and said means for modifying.

23. The computer system of claim 21, further comprising:

means for identifying a virtual destination group address for said packet based on said identifying packet information;

wherein said means for modifying said packet further comprises means for replacing the destination address with said virtual destination group address to form said modified packet.

24. The computer system of claim 23, wherein said means for modifying said packet by replacing the destination address further comprises means for mapping each destination address in a plurality of destination addresses to the same said virtual destination group address.

25. The computer system of claim 23, wherein said means for modifying said packet by replacing the destination address further comprises means for mapping each destination address in a plurality of destination addresses to one of a plurality of virtual destination group addresses.

26. A method comprising:

translating a source address and a destination address of a packet from (S',G') to (S,G) to produce a translated packet, wherein the packet is received via a multicast channel; and sending the translated packet to one or more members of a multicast group G.

27. The method of claim 26, further comprising:

subscribing to a multicast channel, the multicast channel identified by a first pair of addresses (S',G').

28. The method of claim 27, wherein the translating, the sending, and the subscribing are performed by a router.

29. The method of claim 27, further comprising:

subscribing to a virtual source address S of a single-source multicast channel, wherein the subscribing to the virtual source is performed by one of the members of the multicast group G.

30. The method of claim 26, further comprising:

receiving a second packet via a second multicast channel, the second multicast channel identified by a second pair of addresses (S",G");

translating a source address and a destination address of the second packet from (S",G") to (S, G) to produce a second translated packet; and sending the second translated packet to the members of the multicast group G.

31. The method of claim 26, further comprising:

translating the source address and the destination address of the packet to produce a second translated packet; and sending the second translated packet to one or more members of a second multicast group.

32. The method of claim 26, further comprising: delaying the sending the translated packet for a scheduled delay period.

* * * * *